US009916296B2

(12) United States Patent
Mehta et al.

(10) Patent No.: US 9,916,296 B2
(45) Date of Patent: Mar. 13, 2018

(54) EXPANDING ENTITY AND RELATIONSHIP PATTERNS TO A COLLECTION OF DOCUMENT ANNOTATORS USING RUN TRACES

(71) Applicant: International Business Machines Corporation, Armonk, NY (US)

(72) Inventors: Sameep Mehta, Bangalore (IN); Deepak S. Padmanabhan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/863,817

(22) Filed: Sep. 24, 2015

(65) Prior Publication Data
US 2017/0091161 A1 Mar. 30, 2017

(51) Int. Cl.
G06F 17/21 (2006.01)
G06F 17/22 (2006.01)
G06F 17/24 (2006.01)

(52) U.S. Cl.
CPC ........ G06F 17/241 (2013.01); G06F 17/2288 (2013.01)

(58) Field of Classification Search
CPC ............... G06F 17/241; G06F 17/2247; G06F 17/30017; G06F 17/2288
USPC .................... 715/230–234; 707/672
See application file for complete search history.

(56) References Cited

U.S. PATENT DOCUMENTS

| 8,190,990 B2 | 5/2012 | Le |
| 8,484,238 B2 | 7/2013 | Loeser et al. |
| 8,533,586 B1 | 9/2013 | Meyer et al. |
| 2003/0200034 A1* | 10/2003 | Fellenberg .............. G06F 19/28 702/20 |
| 2004/0243557 A1* | 12/2004 | Broder ................ G06F 17/2785 |
| 2005/0160355 A1* | 7/2005 | Cragun ................. G06F 17/241 715/230 |

(Continued)

OTHER PUBLICATIONS

Murthy et al. Improving Recall of Regular Expressions for Information Extraction, WISE 2012.

(Continued)

*Primary Examiner* — Cesar Paula
*Assistant Examiner* — Carl E Barnes, Jr.
(74) *Attorney, Agent, or Firm* — Ryan, Mason & Lewis, LLP

(57) ABSTRACT

Methods, systems, and computer program products for updating annotator collections using run traces are provided herein. A computer-implemented method includes generating one or more alternate versions of one or more document annotators selected from a set of multiple document annotators; executing, on one or more document data sets, (i) one or more document annotators from the set of multiple document annotators and (ii) the one or more alternate versions to generate log information for each document annotator in the set and each alternate version of the one or more alternate versions; and outputting an instruction to modify, based on the generated log information for each document annotator in the set and each alternate version, at least one document annotator from the set with at least one alternate version from the one or more alternate versions.

16 Claims, 3 Drawing Sheets

(56) References Cited

U.S. PATENT DOCUMENTS

| | | | |
|---|---|---|---|
| 2005/0160356 A1* | 7/2005 | Albornoz | G06F 17/241 |
| | | | 715/229 |
| 2005/0223354 A1* | 10/2005 | Drissi | G06F 8/36 |
| | | | 717/114 |
| 2009/0125542 A1* | 5/2009 | Loeser | G06F 17/30864 |
| 2010/0293451 A1* | 11/2010 | Carus | G06N 99/005 |
| | | | 715/230 |
| 2015/0006961 A1 | 1/2015 | Bourne et al. | |
| 2015/0026559 A1 | 1/2015 | Riediger et al. | |
| 2015/0254223 A1* | 9/2015 | Sakaki | G06F 17/241 |
| | | | 715/230 |
| 2016/0048499 A1 | 2/2016 | Deshmukh et al. | |
| 2016/0350280 A1* | 12/2016 | Lavallee | G06F 17/277 |

OTHER PUBLICATIONS

Mitchell, T., Generalization as Search, Artificial Intelligence, 1982.
Li et al. Regular Expression Learning for Informative Extraction, EMNLP 2008.
Babbar et al. Clustering Based Approach to Learning Regular Expressions over Large Alphabet for Noisy Unstructured Text, AND Workshop 2010.
Krishnamurthy et al. SystemT: A System for Declarative Information Extraction, SIGMOD Record, Dec. 2008 (vol. 37, No. 4).
Wikipedia, Regular Expression, https://en.wikipedia.org/w/index.php?title=Regular_expression&oldid=677574301, Aug. 24, 2015.

* cited by examiner

EXPANDING ENTITY AND RELATIONSHIP PATTERNS TO A COLLECTION OF DOCUMENT ANNOTATORS USING RUN TRACES

FIELD

The present application generally relates to information technology, and, more particularly, to annotator management techniques.

BACKGROUND

Annotators are commonly implemented to extract and mark words and/or phrases from unstructured content. However, challenges arise in annotation techniques due, for example, to inaccurate entity annotators and/or inaccurate relationship annotators, which can arise with changing scenarios and/or outlier scenarios.

SUMMARY

In one embodiment of the present invention, techniques for updating annotator collections using run traces are provided. An exemplary computer-implemented method can include steps of generating one or more alternate versions of one or more document annotators selected from a set of multiple document annotators; executing, on one or more document data sets, (i) one or more document annotators from the set of multiple document annotators and (ii) the one or more alternate versions to generate log information for each document annotator in the set and each alternate version of the one or more alternate versions; and outputting an instruction to modify, based on the generated log information for each document annotator in the set and each alternate version, at least one document annotator from the set with at least one alternate version from the one or more alternate versions.

In another embodiment of the invention, an exemplary computer-implemented method can include steps of generating one or more alternate versions of one or more document annotators selected from a set of multiple document annotators; executing, on one or more document data sets, (i) one or more document annotators from the set of multiple document annotators and (ii) the one or more alternate versions to generate log information for each document annotator in the set and each alternate version of the one or more alternate versions; analyzing the generated log information for each document annotator in the set and each alternate version to generate a score for each of the one or more alternate versions based on each of one or more relationships established between (i) each of the one or more alternate versions and (ii) one or more document annotators from the set of multiple document annotators; and outputting an instruction to modify, based on the score generated for each of the one or more alternate versions, at least one document annotator from the set with at least one alternate version from the one or more alternate versions.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, one or more embodiments of the present invention includes updating annotator collections using run traces. As detailed herein, annotators are often built once and used multiple times, with varying degrees of accuracy. Accordingly, at least one embodiment of the invention includes leveraging information derived from annotator traces on data sets to improve the accuracy of the annotators. Leveraging traces of annotators to generate recommendations for updating annotators can include, as further detailed herein, generalizing patterns in entity annotators as well as generalizing patterns in relationship annotators.

As used herein, an entity pattern can, for example, be in the form of a regular expression that can match occurrences of one or more desired entities. As an example, a phone number entity pattern could look like "1-[0-9]{3}-[0-9]{3}-[0-9]{4}," which indicates that a phone number is anything that starts with a "1" and has a hyphen followed by 3 numeric digits, followed by hyphen, followed by 3 numeric digits, followed by a hyphen, followed by 4 numeric digits. A relationship pattern can typically join two entity patterns by a relationship. By way of illustration, an example "Name-Phone" relationship pattern can include the following: "<Name> is available at <Phone>," wherein <Name> and <Phone> denote matches of Name and Phone patterns. This Name-Phone annotator can be thought of as connecting a person's name with his/her phone number.

One or more embodiments of the invention include generating and/or providing a system for recommending and/or outputting changes to one or more annotators determined by leveraging execution traces on a document data set (that is, annotator traces). Such an embodiment can include implementing an enhanced annotator logger component that uses pattern generalization to expand the set of annotators that are subsequently run to generate log information. Additionally, such an embodiment can include implementing a recommendation engine that analyzes log information generated by the enhanced annotator logger component to identify generalizations to improve annotator coverage.

Figure 1:
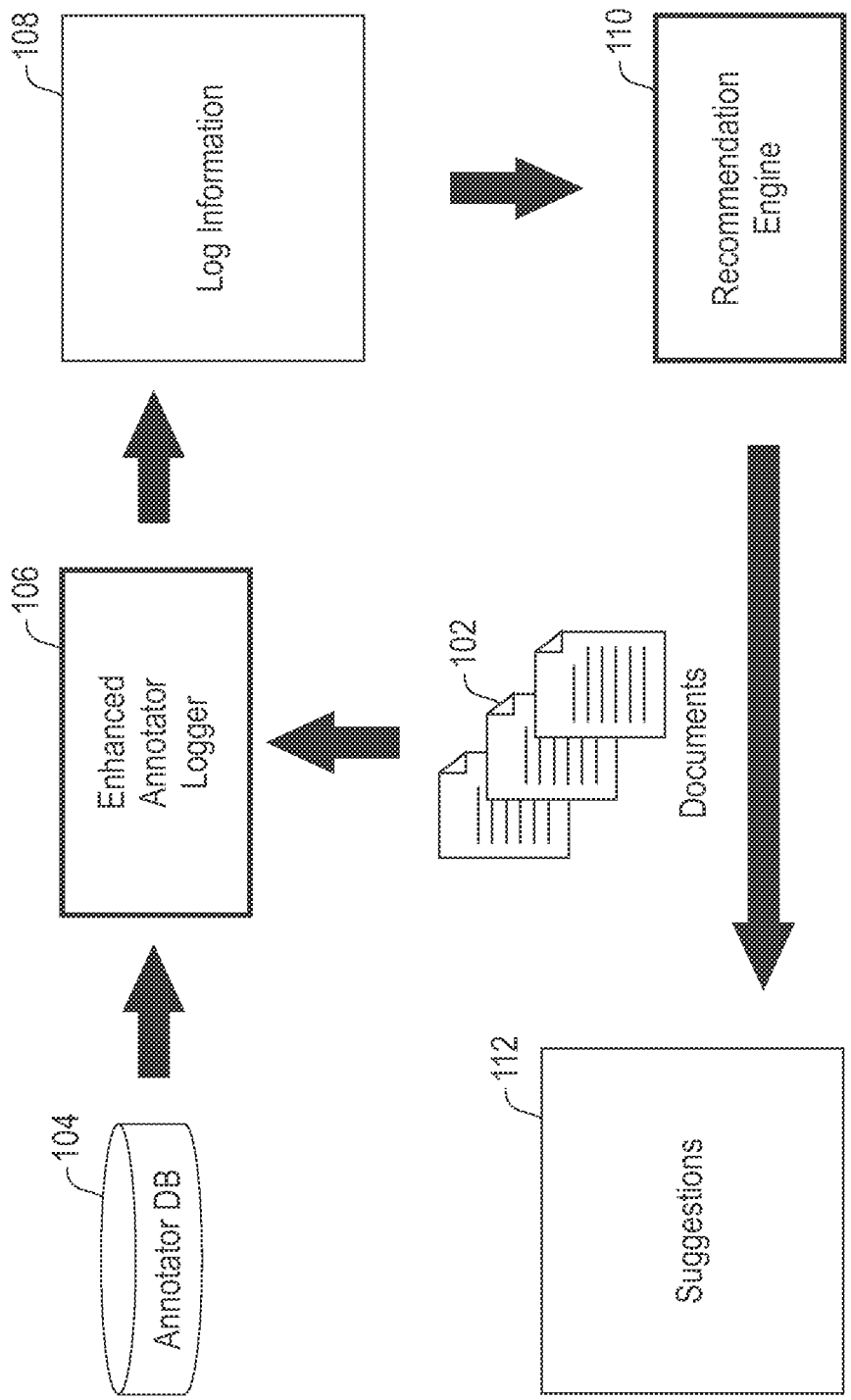
FIG. 1 is a diagram illustrating system architecture, according to an example embodiment of the invention.

FIG. 1 is a diagram illustrating system architecture, according to an embodiment of the invention. By way of illustration, FIG. 1 depicts a collection of documents 102 and an annotator database (DB) 104, which each provide input to an enhanced annotator logger component 106. In at least one embodiment of the invention, DB 104 includes a set of annotators and information pertaining to how those annotators are to be executed (that is, run) on a text document. The enhanced annotator logger component 106 outputs log information 108, which is provided as input to a recommendation engine 110. The recommendation engine 110 subsequently outputs suggestions (or recommendations) 112.

As detailed herein, the enhanced annotator logger component 106 computes generalizations for each entity pattern and relationship pattern from among the annotators in the DB 104. By way of example, Phone.p1 (wherein "Phone" is the name of the annotator and "p1" is the particular pattern used by the annotator)="[0-9\-( )]{8+}" could be generalized to:

p1.gen1="[0-9\-( )]{7+}" (generalized to include shorter patterns); and/or p1.gen2="[0-9\-( )A-Z]{8+}" (generalized to include alphabets).

The generalizations can be computed via one of multiple ways. For example, whenever there is an element in a pattern that matches one of the nodes in a given taxonomy, a generalization is to replace the element by the pattern at its parent node. By way of additional example, whenever there is an element referred to as a quantifier (that is, a specification of the number of times the preceding sub-pattern in the pattern should occur), the element can be generalized to reduce or increase the number therein. Additionally, the set of generalizations available for a pattern can include the set of generalizations available through either of the above-noted options/examples.

By way of additional example, a relationship pattern "[Name] is available at [Phone]" could be generalized to "[Name] (token)? is available at [Phone]." As used herein, a "(token)" represents any word (commonly also including white-space on either side), and "(token)?" refers to a short-hand to represent 0 or 1 occurrence of "(token)." Additionally, such generalizations as noted above may be performed using a taxonomy.

The enhanced annotator logger component 106 also runs the annotators (obtained from DB 104) and their respective generalizations (computed by the enhanced annotator logger component 106), and logs the firings of the entity annotators and relationship annotators. As used herein, "firings" of an annotator refer to "matches" of a pattern used by the annotator. For relationship annotators, in addition to the actual entities, generalized pattern statistics can also be recorded. For example, in addition to recording that "Name-Phone" did not fire with Phone.p1, the enhanced annotator logger component 106 can also record whether "Name-Phone" fired with Phone.p1. gen1. The additional pattern statistics can aid in the assessment of the benefit of generalizations; in particular, such statistics can be used by the recommendation engine 110 to generate recommendations.

Log information output by the enhanced annotator logger component 106 can include, for example, information such as the following:

Entity E1 fired on Doc1 (Document 1), Offset: 4
Entity E2 fired on Doc1, Offset: 7
Relationship R1 failed on (E1, E2) for Doc1.R1
Reason: Found "XY" while looking for "XZ|XYZ."

As also depicted in FIG. 1, the recommendation engine 110 analyzes the log information 108 generated by the enhanced annotator logger component 106 to identify patterns of interest to output as recommendations/suggestions 112. Recommendations 112 can be targeted at generalizing entity patterns and/or relationship patterns, and both can be identified using relationship log traces. By way of illustration, example suggestions could include the following:

generalizing E1.p1 to E1.p1.gen1 would result in 20% more hits for R1 and 10% more hits for R2 (wherein "E1" is a first entity, "p1" is a first pattern, "gen1" is a first generalization, and "R1" and "R2" are a first relationship annotator and a second relationship annotator, respectively); and generalizing R3.p1 to R3.p1.gen2 would result in 25% more hits for R3 (wherein "R3" is a third relationship annotator, and "gen2" is a second generalization).

Accordingly, the generalizations of the above-noted annotators' expression would enable the annotators to increase their respective firings as indicated above.

In at least one embodiment of the invention, for every relationship annotator, $R_i$, the enhanced annotator logger component 106 runs the relationship annotator (that is, the relationship annotator is applied to a set of documents) and outputs the results. The results can include patterns, and as used herein, $R_i$.patterns=a set of patterns associated with $R_i$ and associated with each entity that $R_i$ uses. For every pattern p in $R_i$.patterns, and for every generalization p.g of p, the enhanced annotator logger component 106 can run $R_i$ by substituting p.g for p, and collect statistics (such as a percentage increase in firings, for example,) and output log information.

Additionally, in at least one embodiment of the invention, input for the recommendation engine 110 can include a generalization threshold, g (for example, 10%). In one or more embodiments of the invention, a generalization threshold can be a configurable system parameter. Also, for every relationship annotator $R_i$, the recommendation engine 110 can collect the number of firings as $R_i$.f. For every generalization variant of $R_i$ ($R_i$.j)that resulted in the number firings being greater than (the number of firings of $R_i$.f* (100+g)/100), the recommendation engine 110 adds the pattern generalization (that is, delta($R_i$, $R_i$.j)) to the results. Further, the recommendation engine 110 additionally collects all results, groups the results by the annotator to which the generalization belongs, and outputs the results in the form of one or more suggestions/recommendations 112.

Accordingly, by way of illustration, an example embodiment of the invention can be carried out via system architecture such as depicted in FIG. 1 by implementing input (from annotator DB 104) of an entity annotator E and a relationship annotator R (which involves entities identified by E). For instance, assume E is a "PhoneNumber" annotator, and R is a relationship annotator generating relations between names and phone numbers. Accordingly, by way of example, [Name, PhoneNumber] can generate a tuple [John Doe, +91-12-34-56-78-99].

Based on this input, the example embodiment of the invention can include outputting a list of possible generalizations of E, with scores (scored using information from R) corresponding to each of the generalizations.

More specifically, at least one example embodiment of the invention can include identifying candidate generalizations for E as (G1, G2, . . . $G_k$) (computed as detailed above, for example). Such an example embodiment can also include implementing a component (such as the enhanced annotator logger component 106 depicted in FIG. 1) that logs generalized matches for E (that is, logs matches for G1, G2, . . . $G_k$) along with relationship annotator matches that are enabled by the candidate generalizations for E. For example, a generalization to include a phone number 1-800-AC- MEINC could cause the relationship annotator to potentially create a match for [AcmeInc.com, 1-800-ACMEINC].

At least one embodiment of the invention additionally includes implementing a component (such as the recommendation engine 110 depicted in FIG. 1) that scores each of the candidate generalizations of E (G1, G2, . . . $G_k$) based on the additional matches that the respective candidate generates for R. For example, a candidate generalization that allows for alphabets to be included in the phone number could generate a higher score due to matches such as [AcmeInc.com, 1-800-ACMEINC] generated by R. Accordingly, in one or more embodiments of the invention, the above-noted score is based on the total number of additional matches generated for R.

While the above example embodiment describes only one entity annotator being generalized for purposes of illustration, it is to be appreciated that one or more embodiments of the invention can incorporate multiple entity annotators being generalized. For example, an example embodiment of the invention can include incorporating a combination such as [E1*, E2*, R], wherein E1 and E2 are distinct entity annotators, each separately being generalized.

Another example embodiment of the invention can include incorporating a combination such as [E*, R1, R2], wherein feedback from two relationship annotators is used to generalize E. Such an embodiment requires the recommendation engine 110 to merge evidences from each relationship annotator (that is, from R1 and from R2). An additional example embodiment of the invention can include incorporating a combination such as [E1, E2, R*], wherein the relationship annotator (R) is generalized using feedback from the each of the two entity annotators (that is, E1 and E2). Yet another example embodiment of the invention can include incorporating a combination such as [E, R1, R2*], wherein feedback from one entity annotator (E) and a first relationship annotator (R1) is used to generalize a second relationship annotator (R2). In one or more embodiments of the invention, all such possible combinations (such as [E, R1, R2*], [E1, E2, R*], etc.) can be explored. Alternatively, at least one embodiment of the invention can include pre-defining a set of possible combinations such that only those combinations are explored.

At least one embodiment of the invention (such as the example embodiment depicted in FIG. 1) can be implemented in multiple real-life scenarios and/or contexts. By way merely of example, at least one embodiment of the invention can be implemented within the context of enriching customer profiles. In such a context, a service provider (for example, a mobile service operator) may possess an abundance of information in the form of emails and contact center transcripts that can include considerable information about customers. For instance, if a customer requires some service at a location X, and the customer writes such in an email or indicates such in a contact center interaction, it can be useful to populate that information in the customer profile because such information can indicates that the customer is likely to have a home or office near location X. Accordingly, in such a context, an example embodiment of the invention can be implemented wherein the annotators in question can include "Customer," "Location," and "LocationServiceRequested" (which is a relationship annotator linking "Customer" and "Location" matches). Similarly, a related context can include additional scenarios of interest such as identifying the type of mobile device (for example, operating system (OS), manufacturer, etc.) that the user is using, etc. Such information can be used to tune recommendations to customers in the future. For instance, if the user uses a phone manufactured by Company S, at least one embodiment of the invention can be implemented to prioritize new offers on devices manufactured by Company S to the customer. In accordance with the descriptions herein, an example embodiment of the invention can be utilized to tune the annotators for enriching customer profiles.

In another example, at least one embodiment of the invention can be implemented within the context of deriving knowledge from medical records. In such a context, an example embodiment of the invention can be implemented in connection with text documents from medical transcriptionists and other textual medical reports. Such documents can include relations such as, for example, "The patient was diagnosed with X and prescribed drug Y because Z was found to be ineffective." In such an example scenario, an example embodiment of the invention can be implemented wherein the annotators in question can include "Disease," Drug," "DrugFoundIneffectiveforDisease" and "DrugPrescribedforDisease." Note that the last two are relationship annotators linking matches of drugs and diseases. Such information identified across a multitude of medical reports can, for example, provide cues for a drug research company that is trying to prioritize directions for drug discovery. In accordance with the descriptions herein, an example embodiment of the invention can be utilized to improve and tune the annotators used so as to increase performance in identifying relations and entities.

Figure 2:
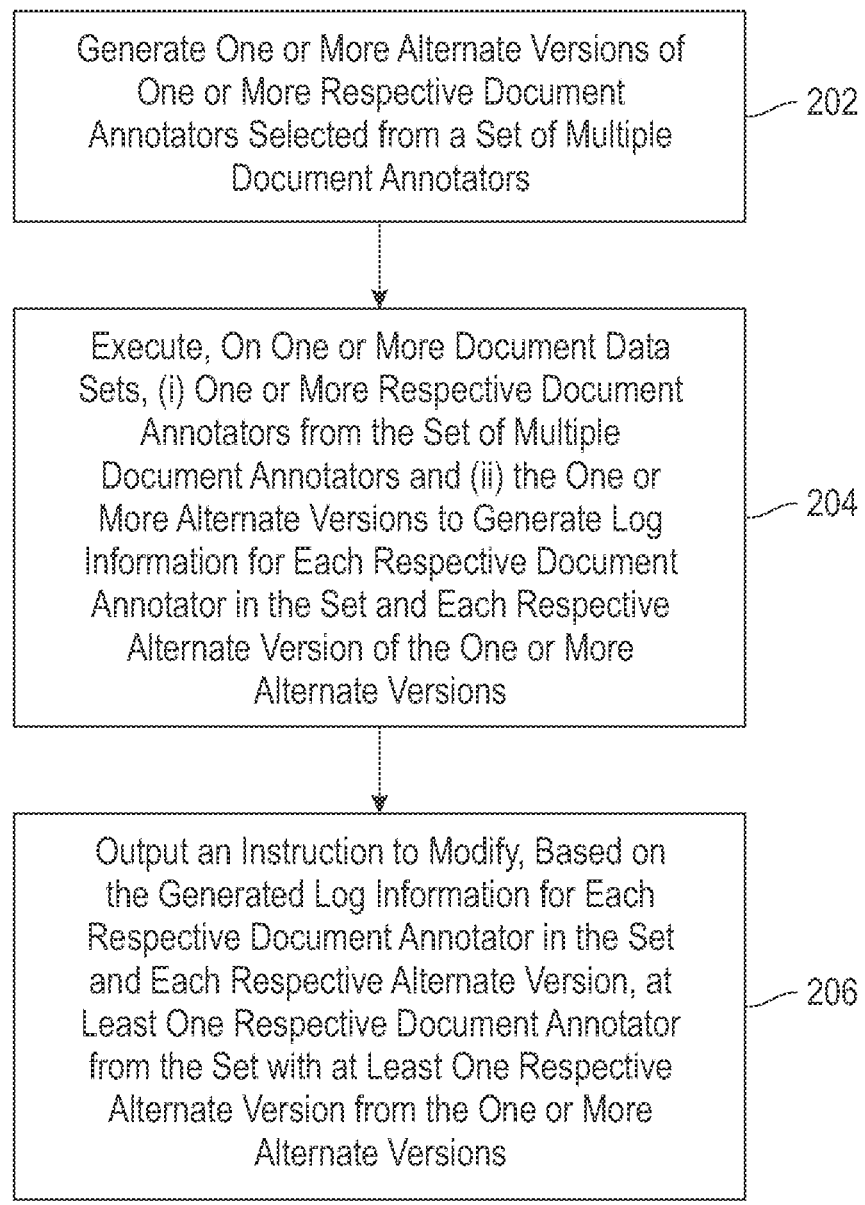
FIG. 2 is a flow diagram illustrating techniques according to an embodiment of the invention.

FIG. 2 is a flow diagram illustrating techniques according to an embodiment of the present invention. Step 202 includes generating one or more alternate versions of one or more document annotators selected from a set of multiple document annotators, wherein said generating is carried out by an enhanced annotator component executing on at least one computing device and communicatively linked to a database storing the set of multiple document annotators. The set of multiple document annotators can include at least one annotator identifying an entity in one or more documents and/or at least one annotator identifying a relationship between two or more entities in one or more documents. Further, generating the one or more alternate versions can include implementing pattern generalization across the set of multiple document annotators.

Step 204 includes executing, on one or more document data sets, (i) one or more document annotators from the set of multiple document annotators and (ii) the one or more alternate versions to generate log information for each document annotator in the set and each alternate version of the one or more alternate versions, wherein said executing is carried out by the enhanced annotator component executing on the at least one computing device and communicatively linked to a source for the one or more document data sets. Additionally, in at least one embodiment of the invention, each of the one or more alternate versions of one or more document annotators can include a generalization of one of the one or more document annotators.

In at least one embodiment of the invention, the executing step can include executing (i) one or more document annotators, from the set of multiple document annotators, that identify one or more entities, and (ii) one or more alternate versions of one or more document annotators, from a set of multiple document annotators, that identify one or more relationships between two or more entities. Alternatively, in at least one embodiment of the invention, the executing step can include executing (i) one or more document annotators, from the set of multiple document annotators, that identify one or more relationships between two or more entities, and (ii) one or more alternate versions of one or more document annotators, from a set of multiple document annotators, that identify one or more entities.

Step 206 includes outputting an instruction to modify, based on the generated log information for each document annotator in the set and each alternate version, at least one document annotator from the set with at least one alternate version from the one or more alternate versions, wherein said outputting is carried out by a recommendation engine executing on the at least one computing device and communicatively linked to the enhanced annotator component.

The techniques depicted in FIG. 2 can also include determining each of the one or more alternate versions of one or more document annotators. Additionally, the techniques depicted in FIG. 2 can include analyzing the generated log information for each document annotator in the set and each alternate version to determine each of one or more relationships established between (i) each of the one or more alternate versions of one or more document annotators and (ii) one or more document annotators from the set of multiple document annotators. One or more embodiments of the invention can also include assigning a score to each of the one or more alternate versions of one or more document annotators, wherein said score is based on a number of determined relationships established between (i) the one or more alternate versions of one or more document annotators and (ii) each of the one or more document annotators from the set of multiple document annotators.

Also, an additional embodiment of the invention includes generating one or more alternate versions of one or more document annotators selected from a set of multiple document annotators, wherein said generating is carried out by an enhanced annotator component executing on at least one computing device and communicatively linked to a database storing the set of multiple document annotators. Such an embodiment also includes executing, on one or more document data sets, (i) one or more document annotators from the set of multiple document annotators and (ii) the one or more alternate versions to generate log information for each document annotator in the set and each alternate version of the one or more alternate versions, wherein said executing is carried out by the enhanced annotator component executing on the at least one computing device and communicatively linked to a source for the one or more document data sets. Further, such an embodiment includes analyzing the generated log information for each document annotator in the set and each alternate version to generate a score for each of the one or more alternate versions based on each of one or more relationships established between (i) each of the one or more alternate versions and (ii) one or more document annotators from the set of multiple document annotators, wherein said analyzing is carried out by a to recommendation engine executing on the at least one computing device and communicatively linked to the enhanced annotator component. Additionally, such an embodiment includes outputting an instruction to modify, based on the score generated for each of the one or more alternate versions, at least one document annotator from the set with at least one alternate version from the one or more alternate versions, wherein said outputting is carried out by the recommendation engine executing on the at least one computing device.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
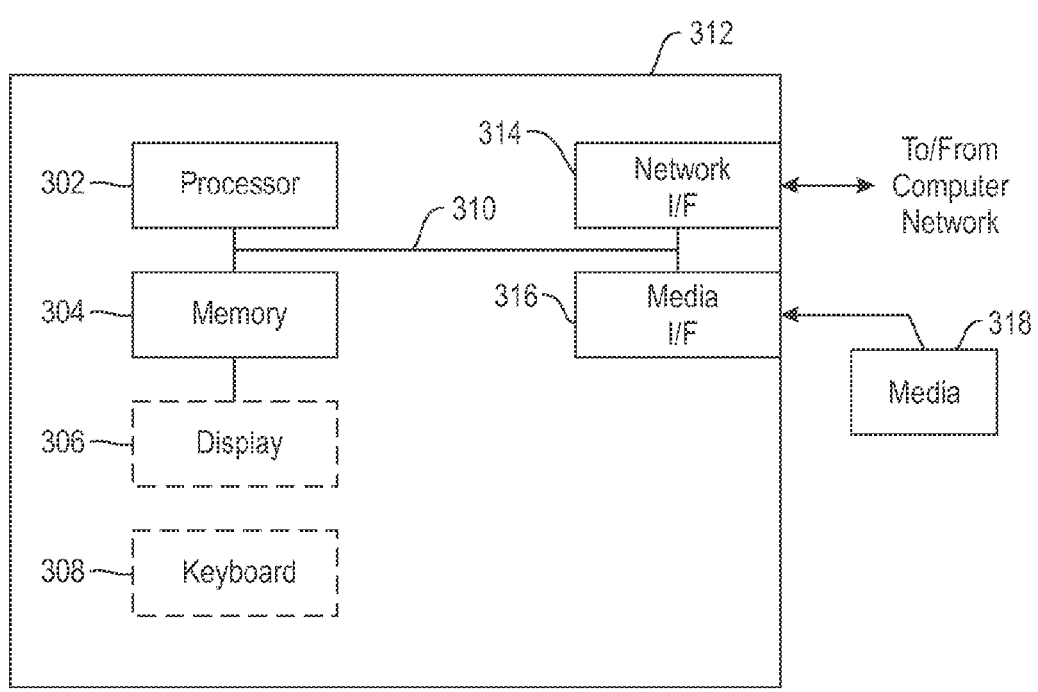
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform one or more embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, using annotator traces to generate recommendations to alter annotators.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   generating one or more alternate versions of one or more document annotators selected from a set of multiple document annotators, wherein each of the one or more alternate versions comprises a version of one of the selected document annotators that contains (i) one or more generalizations of one or more entity patterns derived from the selected document annotator and (ii) one or more generalizations of one or more relationship patterns derived from the selected document annotator, wherein said generating the alternate versions comprises implementing entity pattern generalization and relationship pattern generalization across the set of multiple document annotators, wherein said entity pattern generalization comprises replacing at least one element in an entity pattern of the given document annotator with an expanded version of the element to increase entity matches of the given document annotator to a given taxonomy, and said relationship pattern generalization comprises replacing at least one element in a relationship pattern of the given document annotator with an expanded version of the element to increase relationship matches of the given document annotator to a given taxonomy, and wherein said generating is carried out by an enhanced annotator component executing on at least one computing device and communicatively linked to a database storing the set of multiple document annotators;
   executing, on one or more document data sets, (i) one or more document annotators from the set of multiple document annotators and (ii) the one or more alternate versions to generate log information for each document annotator in the set and each alternate version of the one or more alternate versions, wherein said executing is carried out by the enhanced annotator component executing on the at least one computing device and communicatively linked to a source for the one or more document data sets; and
   outputting an instruction to modify, based on the generated log information for each document annotator in the set and each alternate version, at least one document annotator from the set with at least one alternate version from the one or more alternate versions, wherein said outputting is carried out by a recommendation engine executing on the at least one computing device and communicatively linked to the enhanced annotator component.

2. The method of claim 1, wherein the set of multiple document annotators comprises at least one annotator identifying an entity in one or more documents.

3. The method of claim 1, wherein the set of multiple document annotators comprises at least one annotator identifying a relationship between two or more entities in one or more documents.

4. The method of claim 1, comprising:
   determining each of the one or more alternate versions of one or more document annotators.

5. The method of claim 1, comprising:
   analyzing the generated log information for each document annotator in the set and each alternate version to determine each of one or more relationships established between (i) each of the one or more alternate versions of one or more document annotators and (ii) one or more document annotators from the set of multiple document annotators.

6. The method of claim 5, comprising:
assigning a score to each of the one or more alternate versions of one or more document annotators, wherein said score is based on a number of determined relationships established between (i) each of the one or more alternate versions of one or more document annotators and (ii) each of the one or more document annotators from the set of multiple document annotators.

7. The method of claim 1, wherein said executing comprises executing (i) one or more document annotators, from the set of multiple document annotators, that identify one or more entities, and (ii) one or more alternate versions of one or more document annotators, from the set of multiple document annotators, that identify one or more relationships between two or more entities.

8. The method of claim 1, wherein said executing comprises executing (i) one or more document annotators, from the set of multiple document annotators, that identify one or more relationships between two or more entities, and (ii) one or more alternate versions of one or more document annotators, from the set of multiple document annotators, that identify one or more entities.

9. A computer program product, the computer program product comprising a computer readable storage medium having program instructions embodied therewith, the program instructions executable by a device to cause the device to:
generate one or more alternate versions of one or more document annotators selected from a set of multiple document annotators, wherein each of the one or more alternate versions comprises a version of one of the selected document annotators that contains (i) one or more generalizations of one or more entity patterns derived from the selected document annotator and (ii) one or more generalizations of one or more relationship patterns derived from the selected document annotator,
wherein said generating the alternate versions comprises implementing entity pattern generalization and relationship pattern generalization across the set of multiple document annotators, wherein said entity pattern generalization comprises replacing at least one element in an entity pattern of the given document annotator with an expanded version of the element to increase entity matches of the given document annotator to a given taxonomy, and said relationship pattern generalization comprises replacing at least one element in a relationship pattern of the given document annotator with an expanded version of the element to increase relationship matches of the given document annotator to a given taxonomy;
execute, on one or more document data sets, (i) one or more document annotators from the set of multiple document annotators and (ii) the one or more alternate versions to generate log information for each document annotator in the set and each alternate version of the one or more alternate versions; and
output an instruction to modify, based on the generated log information for the one or more document annotators in the set and each alternate version, at least one document annotator from the set with at least one alternate version from the one or more alternate versions.

10. The computer program product of claim 9, wherein the set of multiple document annotators comprises (i) at least one annotator identifying an entity in one or more documents and (ii) at least one annotator identifying a relationship between two or more entities in one or more documents.

11. A system comprising:
a memory; and
at least one processor coupled to the memory and configured for:
generating one or more alternate versions of one or more document annotators selected from a set of multiple document annotators, wherein each of the one or more alternate versions comprises a version of one of the selected document annotators that contains (i) one or more generalizations of one or more entity patterns derived from the selected document annotator and (ii) one or more generalizations of one or more relationship patterns derived from the selected document annotator,
wherein said generating the alternate versions comprises implementing entity pattern generalization and relationship pattern generalization across the set of multiple document annotators, wherein said entity pattern generalization comprises replacing at least one element in an entity pattern of the given document annotator with an expanded version of the element to increase entity matches of the given document annotator to a given taxonomy, and said relationship pattern generalization comprises replacing at least one element in a relationship pattern of the given document annotator with an expanded version of the element to increase relationship matches of the given document annotator to a given taxonomy, and wherein said generating is carried out by an enhanced annotator component executing on at least one computing device and communicatively linked to a database storing the set of multiple document annotators;
executing, on one or more document data sets, (i) one or more document annotators from the set of multiple document annotators and (ii) the one or more alternate versions to generate log information for each document annotator in the set and each alternate version of the one or more alternate versions, wherein said executing is carried out by the enhanced annotator component executing on the at least one processor and communicatively linked to a source for the one or more document data sets; and
outputting an instruction to modify, based on the generated log information for each document annotator in the set and each alternate version, at least one document annotator from the set with at least one alternate version from the one or more alternate versions, wherein said outputting is carried out by a recommendation engine executing on the at least one processor and communicatively linked to the enhanced annotator component.

12. A computer-implemented method, comprising:
generating one or more alternate versions of one or more document annotators selected from a set of multiple document annotators, wherein each of the one or more alternate versions comprises a version of one of the selected document annotators that contains (i) one or more generalizations of one or more entity patterns derived from the selected document annotator and (ii)

one or more generalizations of one or more relationship patterns derived from the selected document annotator, wherein said generating the alternate versions comprises implementing entity pattern generalization and relationship pattern generalization across the set of multiple document annotators, wherein said entity pattern generalization comprises replacing at least one element in an entity pattern of the given document annotator with an expanded version of the element to increase entity matches of the given document annotator to a given taxonomy, and said relationship pattern generalization comprises replacing at least one element in a relationship pattern of the given document annotator with an expanded version of the element to increase relationship matches of the given document annotator to a given taxonomy, and wherein said generating is carried out by an enhanced annotator component executing on at least one computing device and communicatively linked to a database storing the set of multiple document annotators;

executing, on one or more document data sets, (i) one or more document annotators from the set of multiple document annotators and (ii) the one or more alternate versions to generate log information for each document annotator in the set and each alternate version of the one or more alternate versions, wherein said executing is carried out by the enhanced annotator component executing on the at least one computing device and communicatively linked to a source for the one or more document data sets;

analyzing the generated log information for each document annotator in the set and each alternate version to generate a score for each of the one or more alternate versions based on each of one or more relationships established between (i) each of the one or more alternate versions and (ii) one or more document annotators from the set of multiple document annotators, wherein said analyzing is carried out by a recommendation engine executing on the at least one computing device and communicatively linked to the enhanced annotator component; and outputting an instruction to modify, based on the score generated for each of the one or more alternate versions, at least one document annotator from the set with at least one alternate version from the one or more alternate versions, wherein said outputting is carried out by the recommendation engine executing on the at least one computing device.

13. The method of claim 12, wherein the set of multiple document annotators comprises at least one annotator identifying an entity in one or more documents.

14. The method of claim 12, wherein the set of multiple document annotators comprises at least one annotator identifying a relationship between two or more entities in one or more documents.

15. The method of claim 12, wherein said executing comprises executing (i) one or more document annotators, from the set of multiple document annotators, that identify one or more entities, and (ii) one or more alternate versions of one or more document annotators, from a set of multiple document annotators, that identify one or more relationships between two or more entities.

16. The method of claim 12, wherein said executing comprises executing (i) one or more document annotators, from the set of multiple document annotators, that identify one or more relationships between two or more entities, and (ii) one or more alternate versions of one or more document annotators, from the set of multiple document annotators, that identify one or more entities.

* * * * *